(12) United States Patent
Holloway et al.

(10) Patent No.: US 6,175,866 B1
(45) Date of Patent: *Jan. 16, 2001

(54) METHOD AND SYSTEM FOR GENERATING UNSUPPORTED NETWORK MONITORING OBJECTS

(75) Inventors: Malcolm Herrick MacDonald Holloway, Durham; Leo Temoshenko, Raleigh, both of NC (US)

(73) Assignee: International Business Machines Corporation, Armonk, NY (US)

(*) Notice: Under 35 U.S.C. 154(b), the term of this patent shall be extended for 0 days.

This patent is subject to a terminal disclaimer.

(21) Appl. No.: 08/977,472

(22) Filed: Nov. 24, 1997

(51) Int. Cl.[7] ............................ G06F 15/16; H04L 12/26
(52) U.S. Cl. .................................................... 709/223
(58) Field of Search ..................... 709/220, 228, 709/226, 203, 223, 200; 703/23, 25, 27

(56) References Cited

U.S. PATENT DOCUMENTS

| | | | |
|---|---|---|---|
| 5,299,207 | * 3/1994 | Fujii | 371/29.1 |
| 5,367,635 | 11/1994 | Bauer et al. | 709/221 |
| 5,638,514 | * 6/1997 | Yoshida et al. | 710/15 |
| 5,706,508 | * 1/1998 | Chen et al. | 707/200 |
| 5,832,226 | * 11/1998 | Suzuki et al. | 709/223 |
| 5,913,037 | * 6/1999 | Spofford et al. | 709/226 |

OTHER PUBLICATIONS

Konopka et al., A multilayer–architecture for SNMP–based, distributed and hierarchical management of local area networks{☐Computer Communications and Networks, 4th Int. Conf. 1995, pp. 272–279.*
Modiri, N. "An implementation of the Common Network Management Information Service Element interfaces" IEEE Communications Magazine, vol.: 29 Jul. 7, 1991, pp. 29–38.*
Willett et al, "LAN management in an IBM framework" IEEE Network, vol.: 2 Mar. 2, 1988, pp. 6–12.*
Pat Gonia et al., "Object–Oriented Device Modeling for Flexible Interoperability", in Proceedings Sensors Expo. Boston, May 16–18, 1995; pp. 263–271.

* cited by examiner

Primary Examiner—Dung C. Dinh
(74) Attorney, Agent, or Firm—John J. Timar

(57) ABSTRACT

A method and system for monitoring and managing a network having at least one network manager resident within a network station and at least one network agent resident within a network device. The method and system accomplish their objects as follows. One or more network parameters of one or more network devices are grouped. In response to the grouping, a group monitor is constructed wherein any changes of the grouped one or more network parameters are reflected by the constructed group monitor. The constructed group monitor can thereafter be monitored for indications of changes in any of the grouped network parameters.

17 Claims, 14 Drawing Sheets

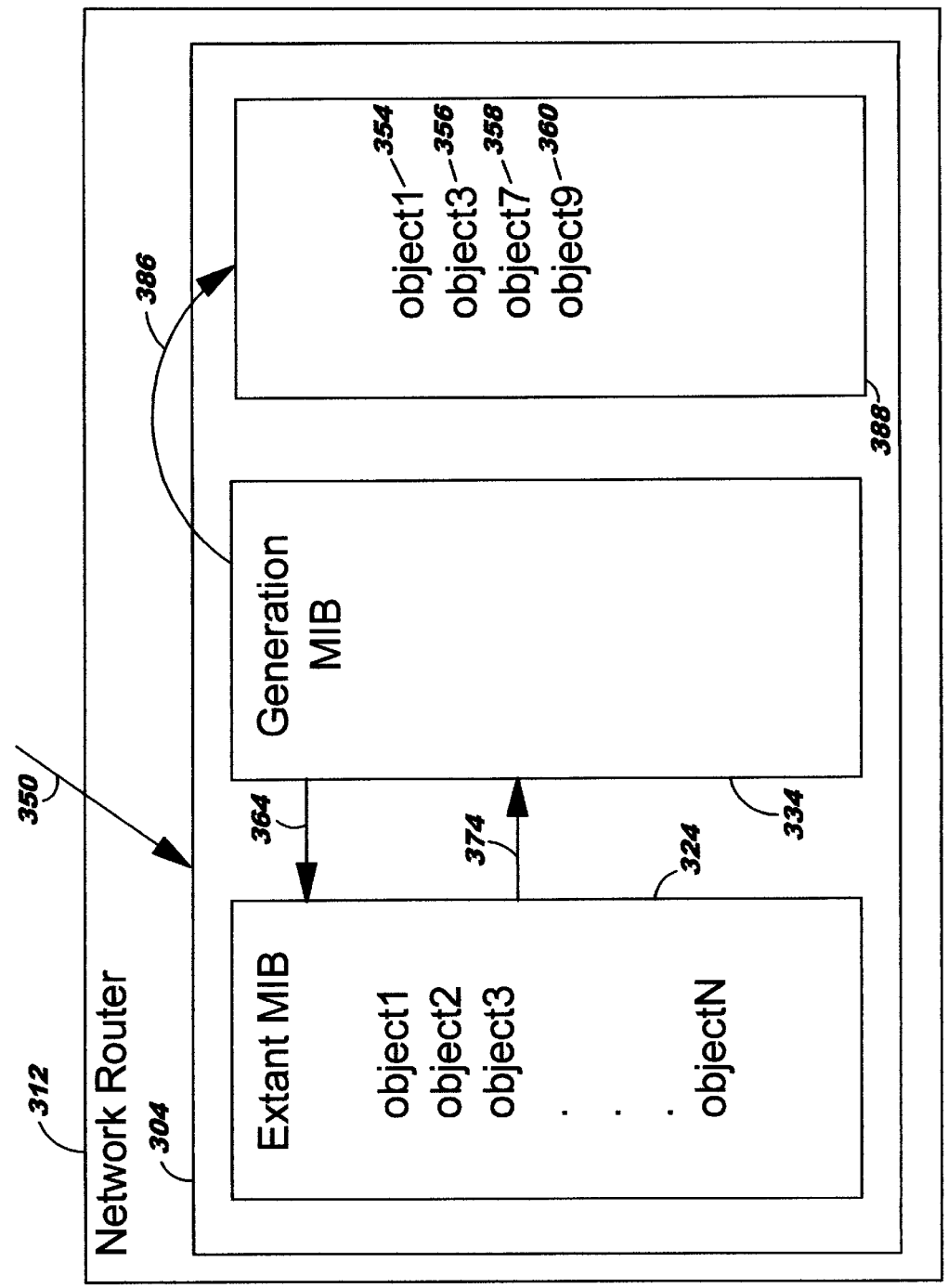

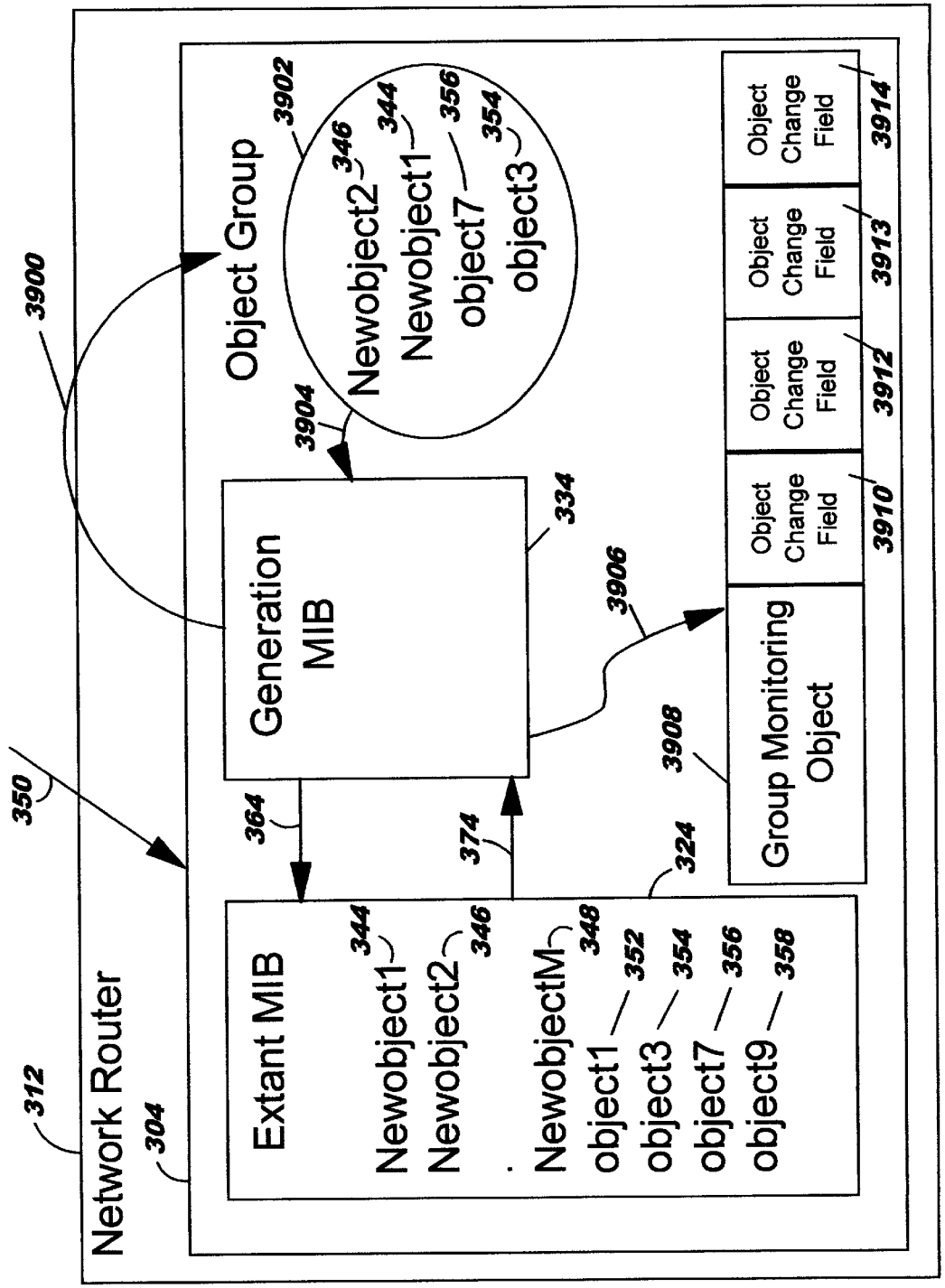

METHOD AND SYSTEM FOR GENERATING UNSUPPORTED NETWORK MONITORING OBJECTS

BACKGROUND OF THE INVENTION

1. Technical Field

The present invention relates to an improved data processing system. In particular, the present invention relates to an improved method and system that utilize objects. Yet more still more particularly, the present invention relates to an improved method and system that utilize objects for managing network devices.

2. Description of the Related Art

The manipulation of data in a data processing system is well known in the prior art. Data may be manipulated in many ways in a modern data processing system including: data accessing, data decoding, data communication, data compression, data conversion, data entry, data exchange, data filing, data linking, data locking, data mapping, data modeling, data recording, data sorting, and data transferring. The large amounts of data which are available to the user of a modern data processing system often become overwhelming in magnitude and complexity.

As a result of the increasing complexity of data processing systems, attempts have been made to simplify the interface between a user and the large amounts of data present with in a modern data processing system. One example of an attempt to simplify the interface between a user and a data processing system is the use of a so called Graphical User Interface (GUI) to provide an intuitive and graphical interface between the user and the data processing system. The Common User Access (CUA) user interface is one example of such a GUI. "Common User Access" is a trademark of International Business Machines Corporation. The CUA user interface is often employed to organize and present large amounts of data to a user in a graphical and intuitive manner. One situation in which large amounts of data may be presented to a user involves modern distributed data processing systems.

Modern distributed data processing systems, also called networks, may consist of hundreds or thousands of computing devices of varies kinds, often manufactured by different vendors and interconnected by many types of transmission media, including telephone lines, satellites, digital microwave radio, optical fibers, or digital data lines. They may include local or wide area configurations. Administrators managing a network require an ability to determine the status of the various computing devices within the network in order to monitor and manage resources within the network. Currently, an administrator may view various components within the network in the form of nodes or icons displayed at the administrator's station. As the number of nodes (computers or other data processing systems) increase, the display becomes more cluttered and information is harder to discern.

As noted, a data network may consist of literally thousands of non-homogeneous devices. Many such devices have primitive capabilities relating to reporting their internal statuses (e.g., available memory, data throughput). However, because the devices are non-homogeneous, their reporting capabilities tend to be non-homogeneous also. As a result of the non-homogeneity of the reporting capabilities, network management utilizing such nonhomogeneous reporting capabilities tends to be very bandwidth and computing intensive.

That is, due to the inhomogeneity, received data typically requires additional manipulation, thereby making device management using such data computationally intensive. Furthermore, such inhomogeneity also tends to require that device management needs to be done at one or more centralized locations by computational devices that "know the whole picture" or can aggregate such inhomogeneous data into a coherent whole. Also, one additional difficulty exists in that the reported status information cannot be aggregated in any way to reflect user priorities, in that the non-homogeneous devices' reporting capabilities are typically a pre-defined set, from one any particular user (network or device manager) must work.

In light of the foregoing, it is apparent that a need exists for a method and system which will facilitate network or device management and monitoring in a decentralized way that reduces computational and bandwidth inefficiencies and allows a user to define what status information will be kept and reported.

SUMMARY OF THE INVENTION

It is therefore one object of the present invention to provide an improved data processing system.

It is therefore another object of the present invention to provide an improved data processing system method and system that utilize objects.

It is yet another object of the present invention to provide an improved method and system that utilize objects for managing network devices.

A method and system for monitoring and managing a network having at least one network manager resident within a network station and at least one network agent resident within a network device. The method and system accomplish their objects as follows. One or more network parameters of one or more network devices are grouped. In response to the grouping, a group monitor is constructed wherein any changes of the grouped one or more network parameters are reflected by the constructed group monitor. The constructed group monitor can thereafter be monitored for indications of changes in any of the grouped network parameters.

The above as well as additional objectives, features, and advantages of the present invention will become apparent in the following detailed written description.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 3C shows the interaction between generation MIB and extant MIB when a create object/MIB command contains the command to create one or more new MIBs from objects existing within the pre-loaded device-specific MIBs;

FIG. 3F shows the interaction between generation MIB and extant MIB when a create object/MIB command contains the command to create one or more new objects which serve to monitor the change of status of one or more groups of objects;

DETAILED DESCRIPTION OF PREFERRED EMBODIMENT

Figure 1:
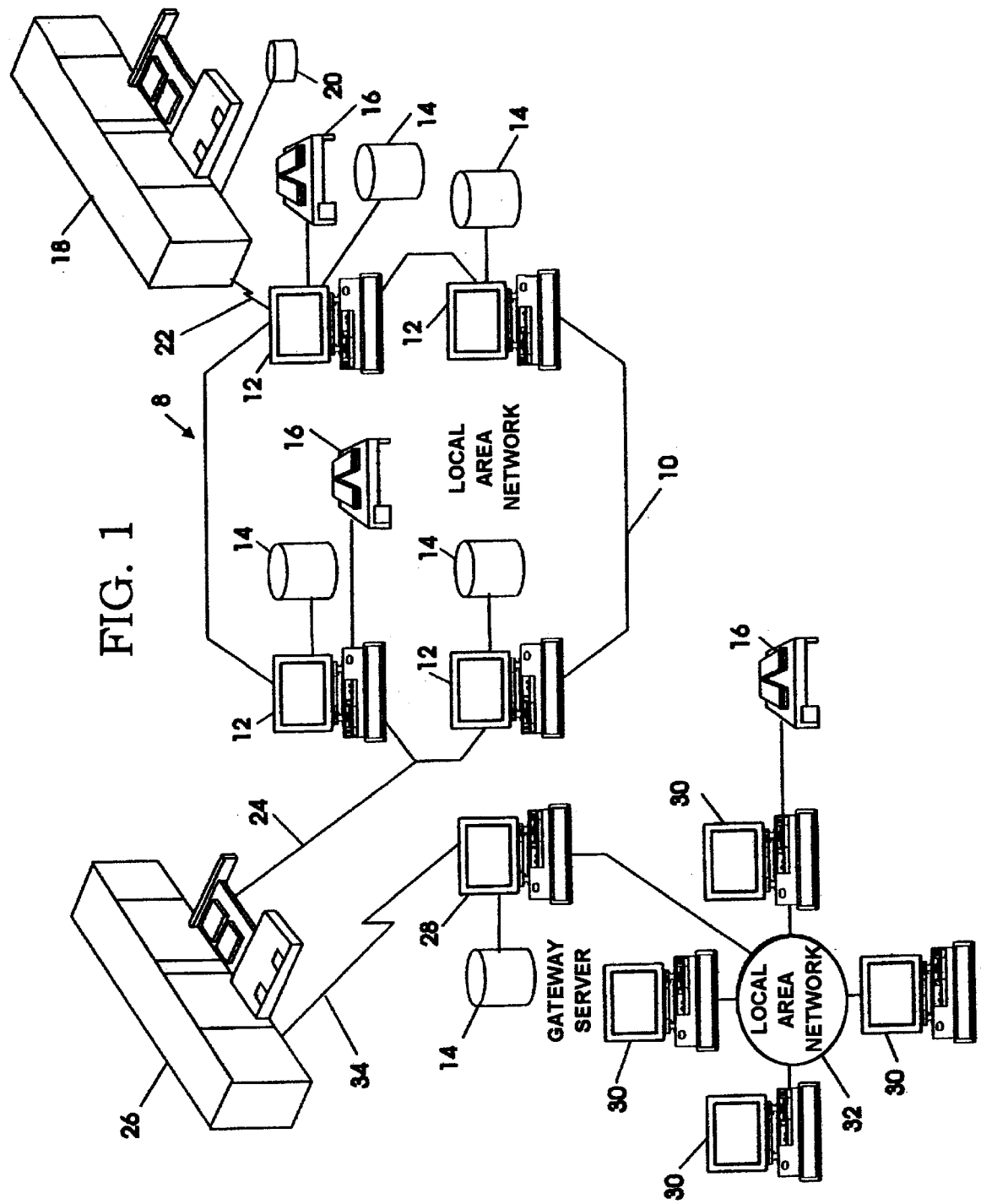
FIG. 1 depicts a pictorial representation of a data processing system which may be utilized to implement a method and system of the present invention.

With reference now to the figures, and in particular with reference to FIG. 1, there is depicted a pictorial representation of a data processing system 8 which may be utilized to implement a method and system of the present invention. As may be seen, data processing system 8 may include a plurality of networks, such as Local Area Networks (LAN) 10 and 32, each of which preferably includes a plurality of individual computers 12 and 30, respectively. Of course, those skilled in the art will appreciate that a plurality of Intelligent Work Stations (IWS) coupled to a host processor may be utilized for each such network.

As is common in such data processing systems, each individual computer may be coupled to a storage device 14 and/or a printer/output device 16. One or more such storage devices 14 may be utilized, in accordance with the method of the present invention, to store documents or resource objects which may be periodically accessed by any user within data processing system 8. In a manner well known in the prior art, each such document or resource object stored within a storage device 14 may be freely interchanged throughout data processing system 8 by transferring a document to a user at an individual computer 12 or 30, for example.

Still referring to FIG. 1, it may be seen that data processing system 8 may also include multiple mainframe computers, such as mainframe computer 18, which may be preferably coupled to Local Area Network (LAN) 10 by means of communications link 22. Mainframe computer 18 may also be coupled to a storage device 20 which may serve as remote storage for Local Area Network (LAN) 10. Similarly, Local Area Network (LAN) 10 may be coupled via communications link 24 through a subsystem control unit/communications controller 26 and communications link 34 to a gateway server 28. Gateway server 28 is preferably an individual computer or Interactive Work Station (IWS) which serves to link Local Area Network (LAN) 32 to Local Area Network (LAN) 10.

As discussed above with respect to Local Area Network (LAN) 32 and Local Area Network (LAN) 10, a plurality of documents or resource objects may be stored within storage device 20 and controlled by mainframe computer 18, as Resource Manager or Library Service for the resource objects thus stored. Of course, those skilled in the art will appreciate that mainframe computer 18 may be located a great geographic distance from Local Area Network (LAN) 10 and similarly Local Area Network (LAN) 10 may be located a substantial distance from Local Area Network (LAN) 32. For example, Local Area Network (LAN) 32 may be located in California while Local Area Network (LAN) 10 may be located within Texas and mainframe computer 18 may be located in New York.

A high density tape data storage system may be found on individual computers 12 and 30, on gateway server 28, on some computer in LAN 10 or 32, or on mainframe computer 18. Individual computers 12 and 30 may be, for example, IBM Aptiva computers.

Figure 2A:
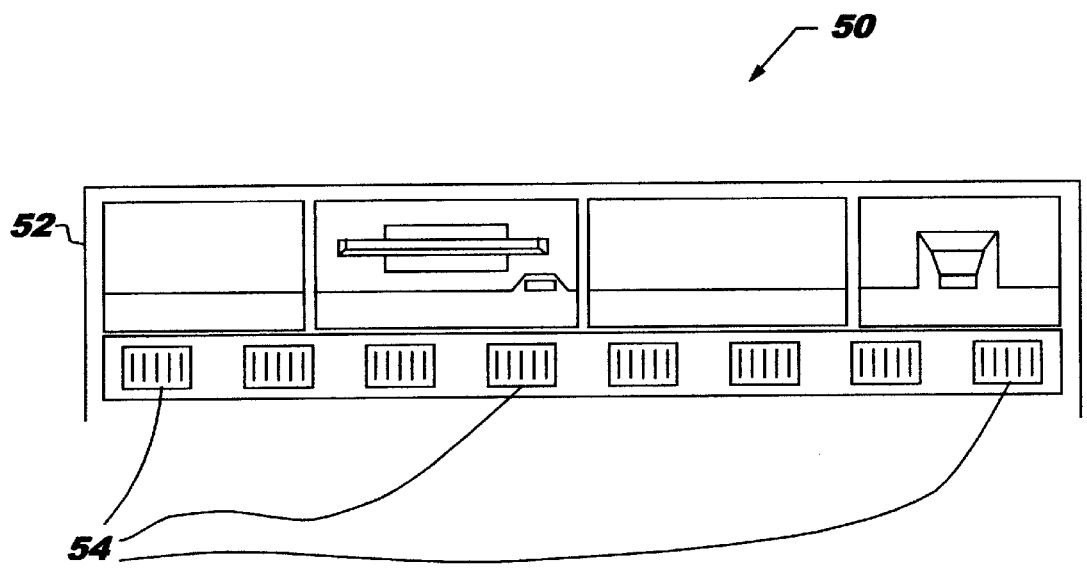
FIG. 2A illustrates a network device which includes a system unit, and a video display terminal.

FIG. 2A illustrates network device 50 (e.g. a network router or switch) which includes a system unit 52, and a series of illustrative network connections 54 (which, as will be understood by those within the art, could be illustrative of connections to networks utilizing Ethernet protocol, Token Ring protocol, TCP/IP protocol, etc). Network device 50 may be implemented utilizing any suitable network device such as the IBM 8272 Nways LAN switch, or the IBM 2210 Nways multiprotocol router, both products of International Business Machines Corporation (IBM), located in Armonk, N.Y. "Nways" and "Aptiva" are registered trademarks of International Business Machines Corporation. A preferred embodiment of the present invention may be implemented in other types of computers, such as for example, intelligent work stations or mini-computers.

Figure 2B:
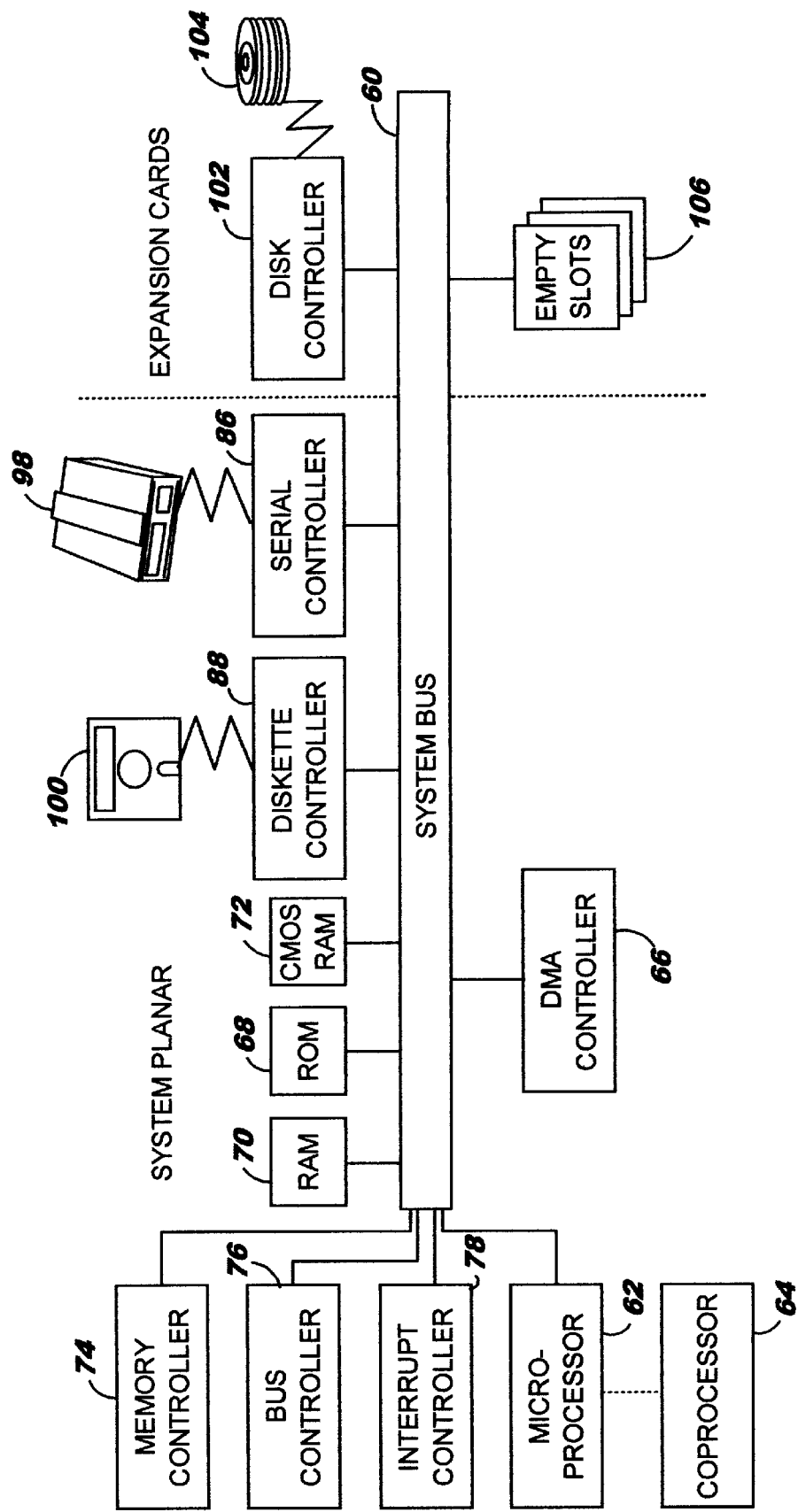
FIG. 2B depicts a block diagram of selected components in a network device in which a preferred embodiment of the present invention may be implemented.

Referring now to FIG. 2B, there is depicted a block diagram of selected components in network device 50 in which a preferred embodiment of the present invention may be implemented via hardware, software, firmware, or any combination thereof. System unit 52 preferably includes a system bus 60 for interconnecting and establishing communication between various components in system unit 52. Microprocessor 62 is connected to system bus 60 and also may have numeric coprocessor 64 connected to it. Direct memory access (DMA) controller 66 is also connected to system bus 60 and allows various devices to appropriate cycles from microprocessor 62 during large I/O transfers.

Read Only Memory (ROM) 68 and Random Access Memory (RAM) 70 are also connected to system bus 60. ROM 68 contains the power-on self test (POST) and the Basic Input/Output System (BIOS) which control hardware operations, such as those involving disk drives and the keyboard. ROM 68 is mapped into the microprocessor 62 address space in RAM 72 is attached to system bus 60 and contains system configuration information.

Also connected to system bus 60 are memory controller 74, bus controller 76, and interrupt controller 78 which serve to aid in the control of data flow through system bus 60 between various peripherals, adapters, and devices. System unit 52 also contains various input/output (I/O) controllers such as: parallel controller 84, serial controller 86, and diskette controller 88. Serial controller 86 provides a hardware interface for devices such as a modem 98. Diskette controller 88 provides a hardware interface for floppy disk unit 100. Expansion cards may also be added to system bus 60, such as disk controller 102, which provides a hardware interface for hard disk unit 104. Empty slots 106 are provided so that other peripherals, adapters, and devices may be added to system unit 52.

Those skilled in the art will appreciate that the hardware depicted in FIG. 2B may vary for specific applications. For example, other peripheral devices such as: optical disk media, audio adapters, or chip programming devices such as a PAL or EPROM programming device, and the like also may be utilized in addition to or in place of the hardware already depicted.

As a final preliminary matter, it is important that while an illustrative embodiment of the present invention has been, and will continue to be, described in the context of a fully functional network device, those skilled in the art will appreciate that the mechanisms of the present invention are capable of being distributed as a program product in a variety of forms, and that an illustrative embodiment of the present invention applies equally regardless of the particular type of signal bearing used to actually carry out the distribution. Examples of signal bearing media include: recordable type media such as floppy disks, hard disk drives, CD ROMs, and transmission type media such as digital and analog communication links.

As discussed above, the present invention is related to an improved method and system that utilize objects for maintaining and managing devices. One illustrative embodiment of the present invention accomplishes the foregoing via the creation and use of modified SNMP objects.

"SNMP" is an acronym for Simple Network Management Protocol, which is the network management protocol of TCP/IP (Transmission Control Protocol/Internet Protocol). SNMP is the most common mechanism (approximately 97 percent of current network monitoring and management is done utilizing SNMP) for monitoring and managing devices existing in networks. There is every indication that SNMP will continue to be used for network device monitoring and management in the future.

SNMP accomplishes network monitoring and management by defining and treating information of interest at network devices as one or more variables. In SNMP parlance, these one variables are referred to as "objects." (Note that these objects are not the same as those utilized in "object oriented programming," but rather are a specific type of data structure related to SNMP.) SNMP accomplishes monitoring and management by inspection and alteration of these objects.

Inspection and alternation of objects is accomplished by the interactions between SNMP "managers" and SNMP "agents." An SNMP "manager" is typically a program that "manages" one or more "agents." A manager runs on a network station and collects information from one or more agents under that manager's purview.

An SNMP "agent" is typically some combination of hardware and software that monitors network traffic. An agent resides at a device in a network and reports to one or more network managers regarding network relevant information related to the state of the device wherein such agent resides.

Each SNMP manager accomplishes monitoring of network traffic by use of a collection of SNMP Management Information Bases (MIBs) maintained by a collection of SNMP agents. A Management Information Base is normally a collection of SNMP objects (or variables), where each object in the collection is indicative of one or more network traffic parameters of interest.

In SNMP, there are typically two types of objects which can form MIBs: (1) simple object, which generally consists of one entry, and (2) a tabular object, which generally consists of a row and column matrix. In SNMP, an "object" holds data. For a tabular object within a MIB, each row and column entry is referred to as an "object," typically identified by the "object's" name plus an index which is some row and column symbolization (e.g., for a 3×3 object with columns a, b, and c, and rows r1, r2, r3, the contents of the first row-second column would be manipulated by reference to "object" name A.R1 (column A, row R1)). Furthermore, since a simple object equates to a 1×1 object matrix, the contents of such can be referred to by reference to an "object" which is just the name of the simple object plus the index; however, for a simple object the index is always zero (e.g., "object name.0").

It is therefore apparent from the foregoing that the term "object," as utilized within the context of SNMP, is radically different than the meaning typically accorded the term in "object oriented programming."

MIBs are collections of simple and/or complex objects. Logically, MIBs are conceived of as, and addressed as, "tree structures." That is, with respect to each MIB, there is typically defined an "anchor" object, which serves as an overall logical focal point, from which other objects depend in the familiar "tree like" structure. These "treelike" structures are a consequence of the use of the ISO standard notation for independent specification of data types and structures for syntax conversion: ASN.1 (Abstract Syntax Notation One). In practice, a MIB is a "treelike" logical structure of objects that exists at an agent resident within a network device, which is inspected and altered by one or more management stations (or managers).

In SNMP, there are defined "types" and allowed "accesses" associated with each object, which define the attributes (what type of data the object can contain and what type of operations can be performed with or on the object) of each object. Typical examples of these types are as follows: (1) an "integer" type, which is a signed (+,-) integer; (2) a "counter" type, which is an unsigned integer which can only increment; (3) a "gauge" type, which is an unsigned integer which can go up or down, and generally used to assess (gauge) relative changes in some parameter; and (4) a "string" type, which is an alphanumeric string. Typical examples of allowed "accesses" are as follows: (1) read only access; (2) write only access; and (3) read and write access.

Managers monitor and maintain the network by interacting with agents regarding the objects in each MIB at each device. As described, the allowable interaction with each agent regarding an object are defined in SNMP by the type and access of object being manipulated.

In SNMP, there are essentially four defined interactions (or messages) between managers and agents regarding objects: GET, GET-NEXT, SET, TRAP.

A "GET" interaction consists of a manager request followed by an agent response, and is used to retrieve the value of a specific object. A "GET-NEXT" interaction consists of a manager request followed by an agent response, and is used to retrieve the value of the next lexicographically larger object. A "SET" interaction consists of a manager request followed by an agent response, and is used to alter the value of a specific object. A "TRAP" interaction consists of an unsolicited message from an agent to a manager, and is used to inform the manager of the occurrence of an event.

It is typical for different network devices to come preloaded with device specific MIBs having objects indicative of certain network information occurring at and within such network devices. These pre-loaded objects can be initialized and thereafter manipulated by one or more network managers in order to maintain information and/or statistics of interest related to the device.

One drawback of such a scheme is that, but for one embodiment of the present invention, if a statistic of interest is not one of the objects resident within a pre-loaded, device specific, MIB, a network manager either cannot construct such a statistic, or has to construct such a statistic from multiple disparate objects which are resident within the pre-loaded MIB. One example of the former would be where information related to available memory at the device is available at the device but is not one of the objects in the pre-loaded device-specific MIB. One example of the latter would be where it was desired to collect aggregate statistics regarding an object that is one of the objects in the pre-loaded device-specific MIB, but where there is no aggregate object in the pre-loaded device-specific MIB. These foregoing limitations are SNMP-specific manifestations of the more general network monitoring and management problems described above in the background section.

The present invention alleviates the network monitoring and management problems noted in the background. One illustrative embodiment of the present invention alleviates these problems by presenting significantly modified and improved managers and agents capable of creating new and/or modified objects and MIBs utilizing standard SNMP.

One embodiment of the present invention enhances SNMP such that an extensible grammar is created and made part of a enhanced SNMP suite. Thereafter, specially modified SNMP managers and agents utilize pre-loaded and pre-specified objects at one or more devices, in conjunction with the defined extensible grammar, to do any number of the following: (1) define complex objects to encompass what is important to the network manager; (2) modify only certain defined objects, thereby reducing traffic; (3) provide an ability to translate information from disparate devices into a standard set of objects with common characteristics; (4) create new objects as needed and then discontinue them when they are no longer needed; and (5) change a created object's definition as needs change.

In order to achieve the foregoing, one embodiment of the present invention utilizes SNMP to allow the creation of a "generation MIB" by utilizing modified agents and network managers (which can be implemented by retrofitting agents and managers in existing network devices, or can be incorporated in newly produced network devices), and an extensible grammar consisting of a base set of arithmetic operators, a base set of arithmetic comparators, a base set of boolean operators, and a base set of bit operators. The base set of arithmetic operators is defined to be "addition", "subtraction", "multiplication", and "division". The base set of arithmetic comparators is defined to be "greater than", "less than", "equal to", "less than or equal to", and "greater than or equal to". The boolean operators are defined to be "and," "or," "not," and "exclusive or." The bit operators are defined to be "or," "and," "xor," and "not."

Figure 3A:
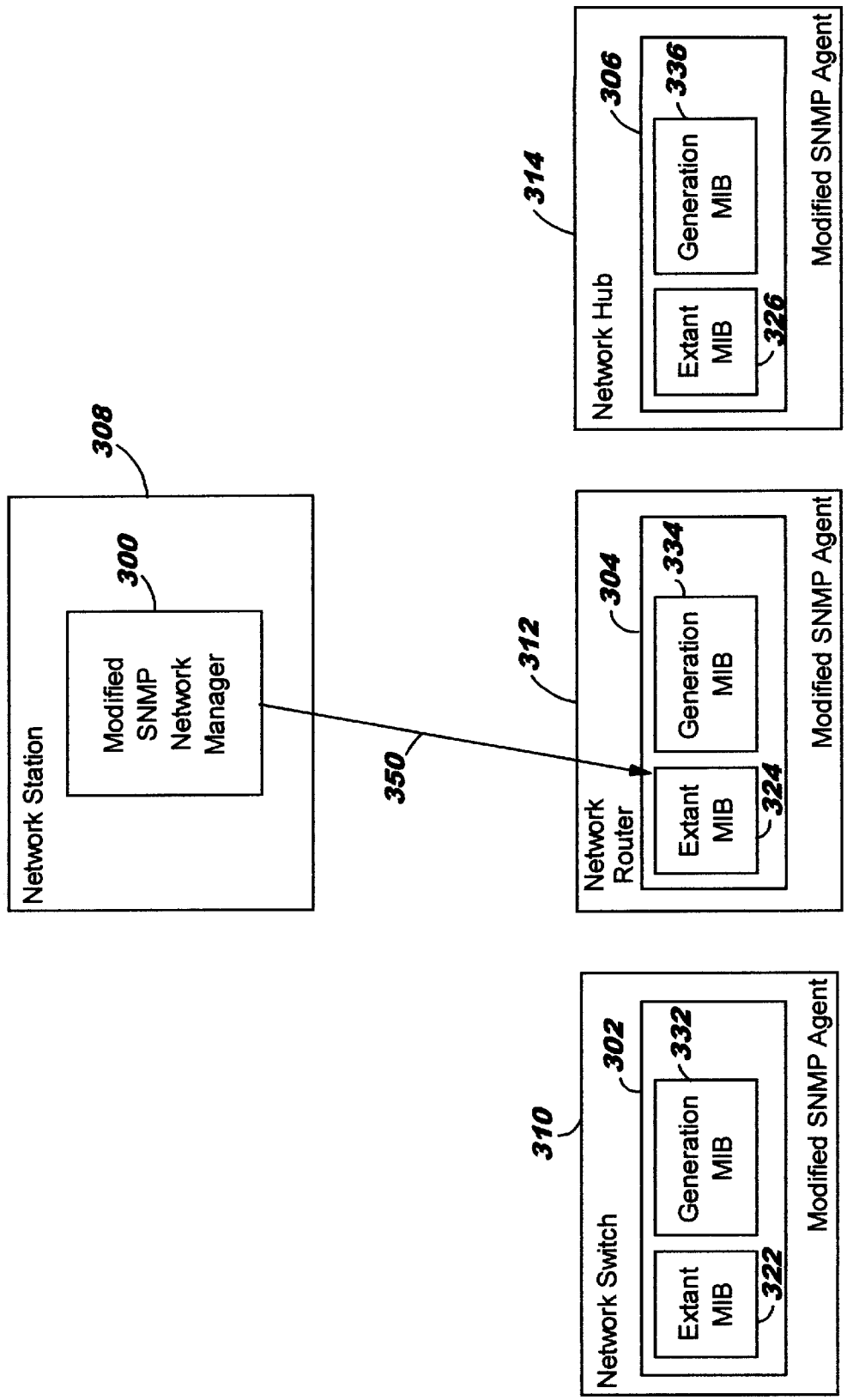
FIG. 3A shows a high-level partially schematic diagram of an illustrative embodiment of the present invention.

FIG. 3A shows a high-level partially schematic diagram of an illustrative embodiment of the present invention. Shown in FIG. 3A is a modified SNMP network manager 300 and modified SNMP agents 302, 304, and 306. Modified SNMP network manager 300 resides within network station 308, while modified SNMP agent 302 resides within network switch 310, modified SNMP agent 304 resides within network router 312, and modified SNMP agent 306 resides within network hub 314.

Contained within each modified SNMP agent 302, 304, and 306 are extant MIBs 322, 324, and 326 and generation MIBs 332, 334, and 336, respectively. Each extant MIB 322, 324, and 326 is representative of a particular version of such MIBs existing at some fixed point in time, which may be the pre-loaded device-specific MIBs discussed above or MIBs that have been created and/or modified by a generation MIB. Each generation MIB 332, 334, and 336 are entities within modified SNMP agents 302, 304, and 306, respectively, which can be used to create one or more new SNMP objects not contained within the pre-loaded device-specific MIBs, create new MIBs from objects existing within the pre-loaded device-specific MIBs, create new MIBs from created new objects, and/or create new MIBs from both created new objects and from objects existing within the pre-loaded device-specific MIBs.

Shown is that at some fixed point in time, modified SNMP agent 304 receives create object/MIB command 350 from modified SNMP network manager 300. Depending upon its associated parameters, create object/MIB command 350 can be a command to create one or more new SNMP objects not contained within the pre-loaded device-specific MIBs, create one or more new MIBs from objects existing within the pre-loaded device-specific MIBs, create one or more new MIBs from created new objects, and/or create new MIBs from both created new objects and from objects existing within the pre-loaded device-specific MIBs. FIGS. 3B, 3C, 3D, and 3E depict events that occur in response to the various possible commands which can be represented by create object/MIB command 350.

Figure 3B:
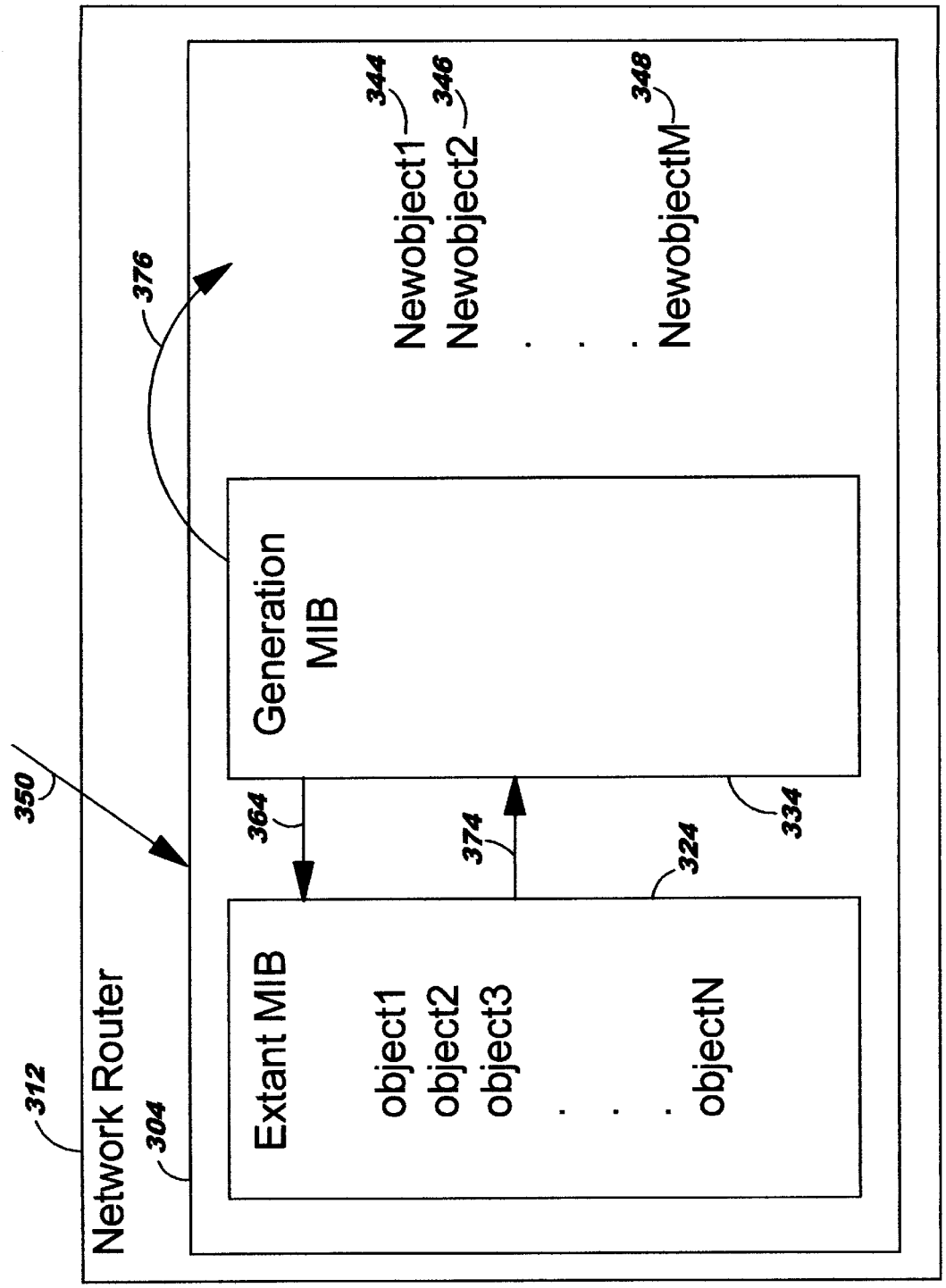
FIG. 3B shows the interaction between generation MIB and extant MIB when a create object/MIB command contains the command to create one or more new SNMP objects not contained within the pre-loaded device-specific MIBs.

FIG. 3B shows the interaction between generation MIB 334 and extant MIB 324 when create object/MIB command 350 contains the command to create one or more new SNMP objects not contained within the pre-loaded device-specific MIBs. Shown is that generation MIB 334 sends query 364 to extant MIB 324 asking what objects are present in extant MIB 324.

Thereafter, extant MIB 324 sends list of objects present 374 back to generation MIB 334. After receipt of list of objects present 374, Generation MIB determines whether the requested new object can be created from the objects present in extant MIB 324. If the new object(s) can be created, generation MIB 334 creates 376 Newobject1–NewobjectM (where M is some positive integer greater) 344–348. Those skilled in the art will understand that the Newobject1–NewobjectM 344–348 created can be maintained separate and apart from extant MIB 324, or can be combined with extant MIB 324, depending upon whether Newobject1–NewobjectM 344–348 is desired to be thereafter treated as part of an MIB extant at the device or is to be continued to be viewed as something separate and apart from the extant MIB(s).

FIG. 3C shows the interaction between generation MIB 334 and extant MIB 324 when create object/MIB command 350 contains the command to create one or more new MIBs from objects existing within the pre-loaded device-specific MIBs. Shown is that generation MIB 334 sends query 364 to extant MIB 324 asking what objects are present in extant MIB 324.

Thereafter, extant MIB 324 sends list of objects present 374 back to generation MIB 334. After receipt of list of objects present 374, generation MIB determines whether the requested one or more new MIBs can be created from the objects present in extant MIB 324. If the new MIB can be created, generation MIB 334 creates 386 new MIB 388 consisting of object1 354, object3 356, object7 358, and object9 360. Those skilled in the art will understand that new MIB 388 can be maintained separate and apart from extant MIB 324, or can be combined with extant MIB 324, or can be overwritten onto extant MIB 324, depending upon whether new MIB 388 is desired to be thereafter treated as part of an MIB extant at the device or is to be continued to be viewed as something separate and apart from the extant MIB(s).

Figure 3D:
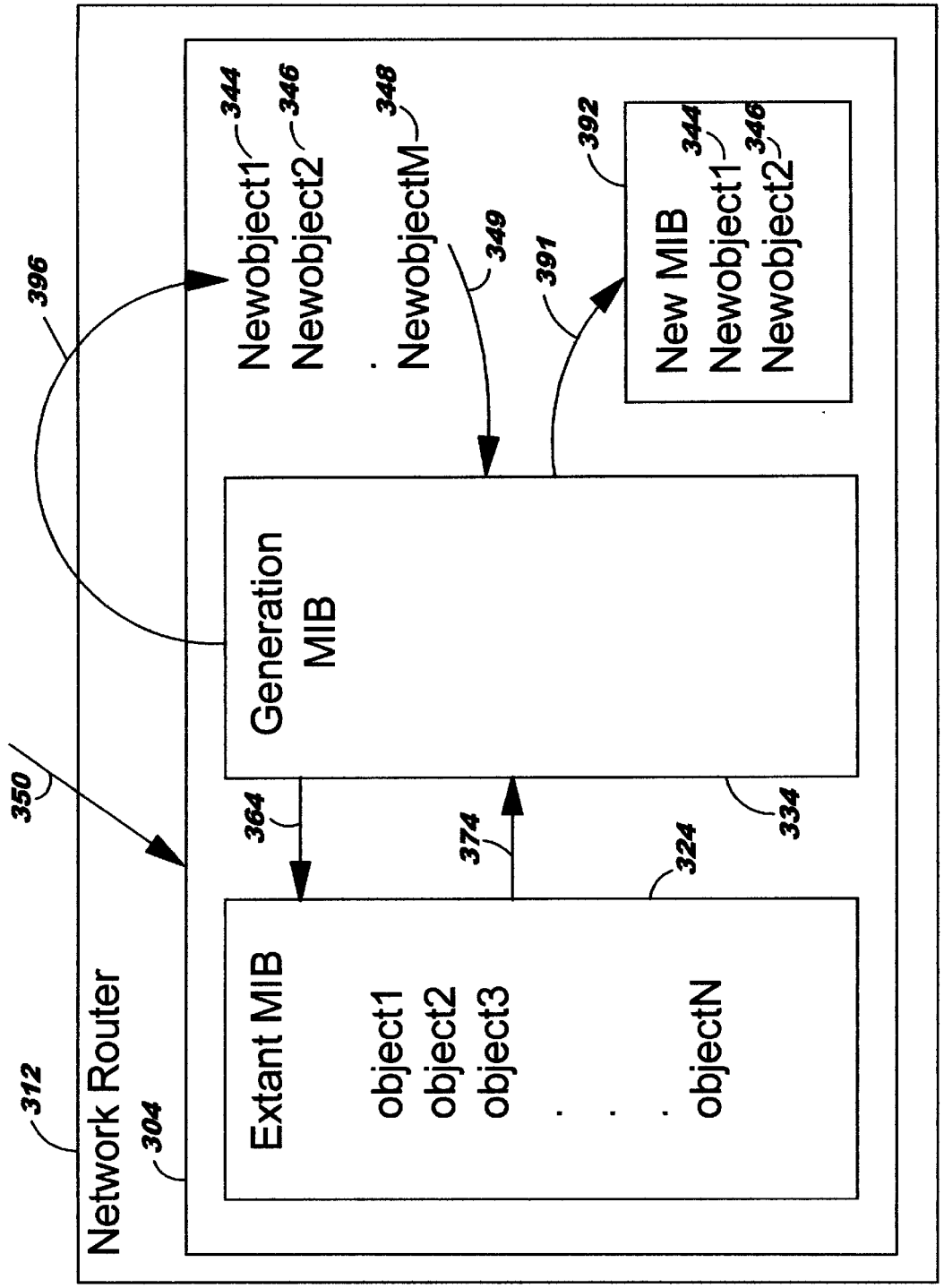
FIG. 3D shows the interaction between generation MIB and extant MIB when a create object/MIB command contains the command to create one or more new MIBs from created new objects.

FIG. 3D shows the interaction between generation MIB 334 and extant MIB 324 when create object/MIB command 350 contains the command to create one or more new MIBs from created new objects. Shown is that generation MIB 334 sends query 364 to extant MIB 324 asking what objects are present in extant MIB 324.

Thereafter, extant MIB 324 sends list of objects present 374 back to generation MIB 334. After receipt of list of objects present 374, generation MIB determines whether the requested new object can be created from the objects present in extant MIB 324. If the new object(s) can be created, generation MIB 334 creates 396 Newobject1–NewobjectM (where M is some positive integer greater) 344–348.

Thereafter, shown is that generation MIB 334 utilizes 349 one or more of the new objects to create 391 the requested new MIB 392, which contains Newobject1 344 and Newobject2 346. Those skilled in the art will understand that the new MIB 392 created can be maintained separate and apart from extant MIB 324, or can be combined with extant MIB 324, or overwritten onto extant MIB 324 depending upon whether new MIB 392 is desired to be thereafter treated as part of an MIB extant at the device or is to be continued to be viewed as something separate and apart from the extant MIB(s).

Figure 3E:
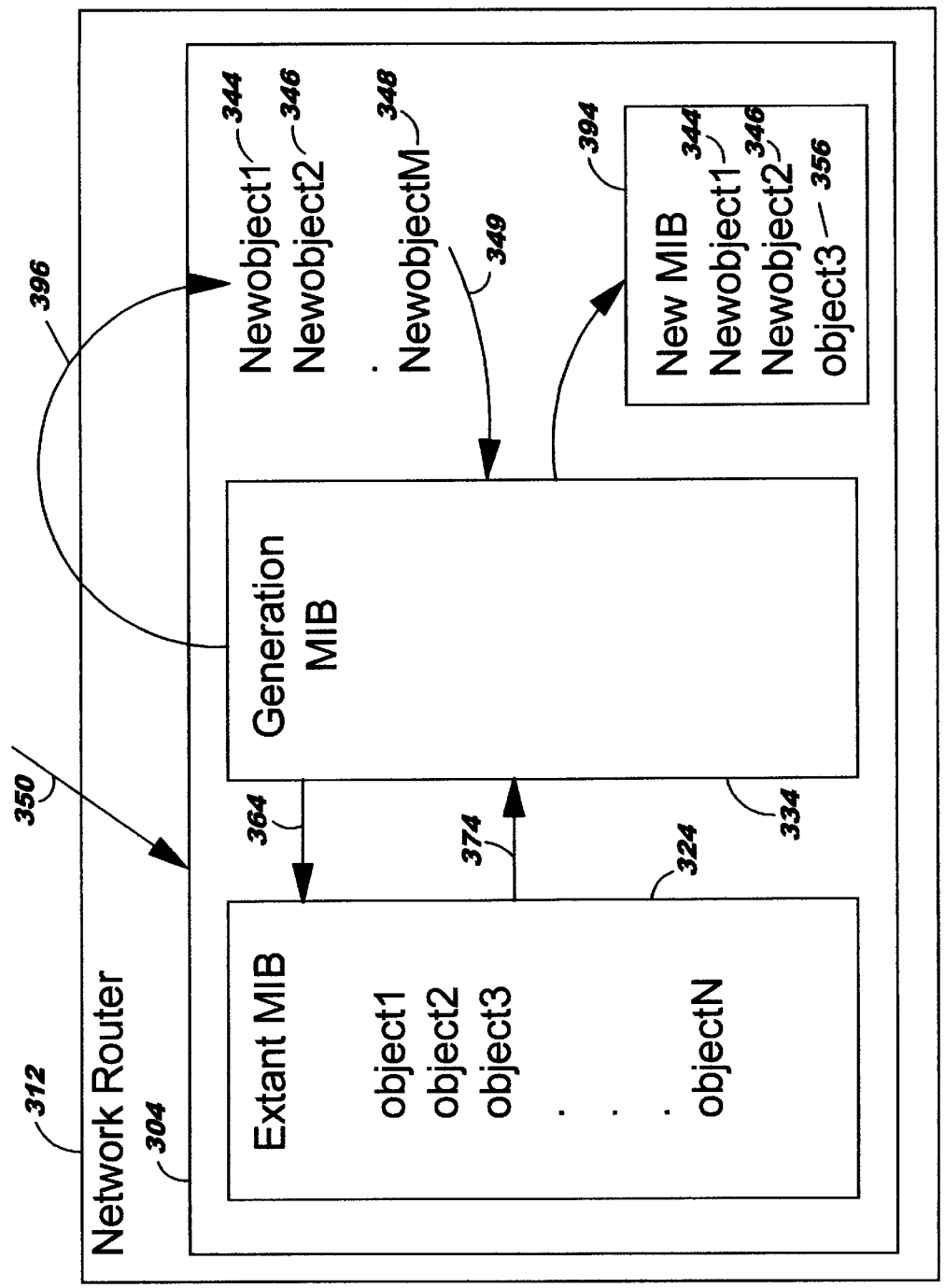
FIG. 3E shows the interaction between generation MIB and extant MIB when a create object/MIB command contains the command to create new MIBs from both created new objects and from objects existing within the pre-loaded device-specific MIBs.

FIG. 3E shows the interaction between generation MIB 334 and extant MIB 324 when create object/MIB command 350 contains the command to create new MIBs from both created new objects and from objects existing within the pre-loaded device-specific MIBs. Shown is that generation MIB 334 sends query 364 to extant MIB 324 asking what objects are present in extant MIB 324.

Thereafter, extant MIB 324 sends list of objects present 374 back to generation MIB 334. After receipt of list of objects present 374, generation MIB determines whether the requested new object can be created from the objects present in extant MIB 324. If the new object(s) can be created, generation MIB 334 creates 396 Newobject1–NewobjectM (where M is some positive integer greater than one) 344–348.

Thereafter, shown is that generation MIB 334 utilizes 349 one or more of the new objects to create the requested new MIB 394, which contains Newobject1 344, Newobject1 346, and object 3 356. Those skilled in the art will understand that the New MIB 390 created can be maintained separate and apart from extant MIB 324, or can be combined with extant MIB 324, or overwritten onto extant MIB 324 depending upon whether new MIB 394 is desired to be thereafter treated as part of an MIB extant at the device or is to be continued to be viewed as something separate and apart from the extant MIB(s).

Subsequent to the creation of new objects or MIBs, such newly created objects or MIBs can be conceptually thought of as a new generation of extant MIB (not shown). Accordingly, the foregoing described operations can be used with successive generations of extant MIBs to create many new and diverse MIBs, which will allow the collection of new and diverse statistical information that is not typically available at various devices in an SNMP managed network.

FIG. 3F shows the interaction between generation MIB 334 and extant MIB 324 when create object/MIB command 350 contains the command to create one or more new objects which serve to monitor the change of status of one or more groups of objects. Shown is that generation MIB 334 sends query 364 to extant MIB 324 asking what objects are present in extant MIB 324.

Thereafter, extant MIB 324 sends list of objects present 374 back to generation MIB 334. After receipt of list of objects present 374, generation MIB 334 determines whether the requested new group of objects can be created from the objects present in extant MIB 324. If the new group of object(s) can be created, generation MIB 334 creates 3900 object Group 3902.

Thereafter, shown is that generation MIB 334 utilizes 3904 the created object group 3902 (consisting of object3 354, Newobject2 346, Newobject1 344, and object7 356) to create 3906 the requested group monitoring object 3908, which contains object change fields 3910–3914.

Shown is that Newobject2 346, Newobject1, 344, object7 356, and object3 354 are, respectively logically associated with object change fields 3910–3914; subsequent to the creation of group monitoring object 3908, and change in any object making up object group 3902 will be reflected by that object's associated object change field (e.g., a change in Newobject1 346 will be reflected by a notation in Newobject1's 346 object change field 3910). In an illustrative embodiment of the present invention, each object change field 3910–3914 is implemented as a single bit which reflects the change of any attributes of such object change field's associated objects in object group 3902; however, those skilled in the art will understand that such object change fields could consist of more than one bit wherein each bit in each field would be associated with a monitored parameter, relevant to its associated object.

It should be noted that, prior to the present invention, information related to any changes in any of the four objects in object group 3902 could only have been monitored by a message appropriate to each such object (e.g., the four objects in the group would have required four separate status request messages, along with a subsequent response). However, the present invention reduces such messaging to just one message, wherein the status of the group monitoring object is checked. Furthermore, while only four group objects have been shown, those skilled in the art will appreciate that the number of objects in the group could run into the hundreds, so the network traffic reduced by the foregoing described implementation of the present invention would, in practice, prove to be quite significant.

Subsequent to the creation of new objects or MIBs, such newly created objects or MIBs can be conceptually thought of as a new generation of extant MIB (not shown). Accordingly, the foregoing described operations can be used with successive generations of extant MIBs to create many new and diverse MIBs, which will allow the collection of new and diverse statistical information that is not typically available at various devices in an SNMP managed network.

Figure 4:
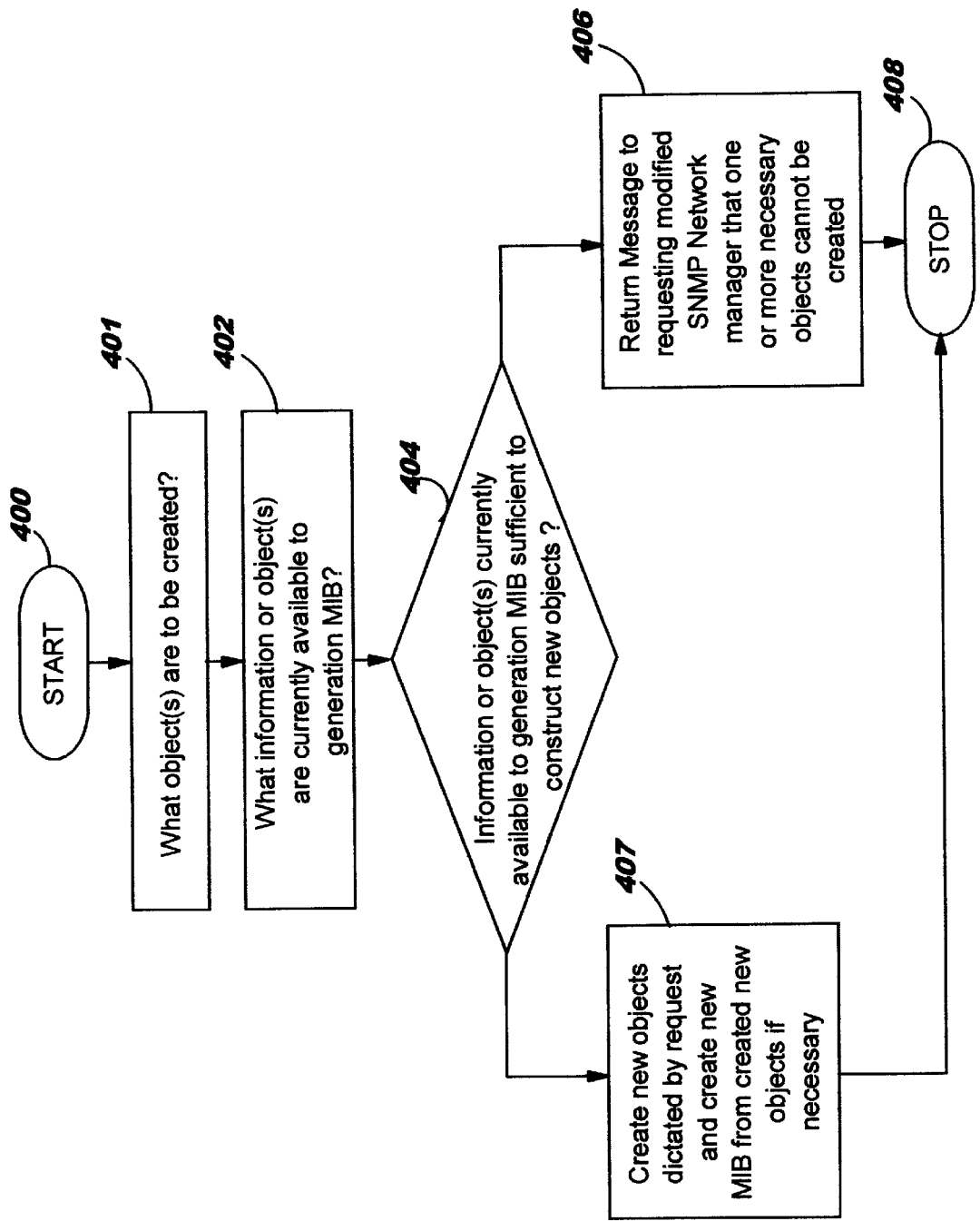
FIG. 4 is a high-level logic flowchart depicting the method and process by which one illustrative embodiment of the present invention determines whether necessary objects can be constructed from objects within an extant MIB.

FIG. 4 is a high-level logic flowchart depicting the method and process by which one illustrative embodiment of the present invention determines whether necessary objects can be constructed from objects within an extant MIB. Method step 400 shows the start of the process. Method step 401 shows that upon receipt of create new MIB/object command 350 by modified SNMP agent 304, modified SNMP agent 304 examines the request and determines what objects are to be created, or what objects the new MIB to be created is to contain (depending upon whether create new MIB/object command 350 is creation of one or more new objects or creation of a new MIB). Method step 402 depicts the determination of what information or objects are currently available to extant MIB 324. Method step 404 illustrates the determination of whether objects currently available to generation MIB (e.g. in extant MIB 324) are sufficient to construct the requested new objects, or the new objects from which the requested new MIB to be created.

If it is determined that information or objects currently available to generation MIB, in conjunction with the defined operations of the extensible grammar as described above, are not sufficient to construct the requested new objects, or the requested new objects from which the new MIB is to be constructed, then the process proceeds to method step 406 wherein it is depicted that a message is returned to the modified SNMP network manager indicating that the requested objects, from which the new MIB is to be constructed, cannot be created. Thereafter, the process proceeds to method step 408 and stops.

If it is determined that objects currently present in extant MIB, in conjunction with the defined operations of the extensible grammar as described above, are sufficient to construct the new objects, or the new objects from which the new MIB is to be constructed, then the process proceeds to method step 407 wherein it is depicted that the requested new objects to be created are created, and that the new MIB is created from them, if such is necessary. Thereafter, the process proceeds to method step 408 and stops.

Figure 5:
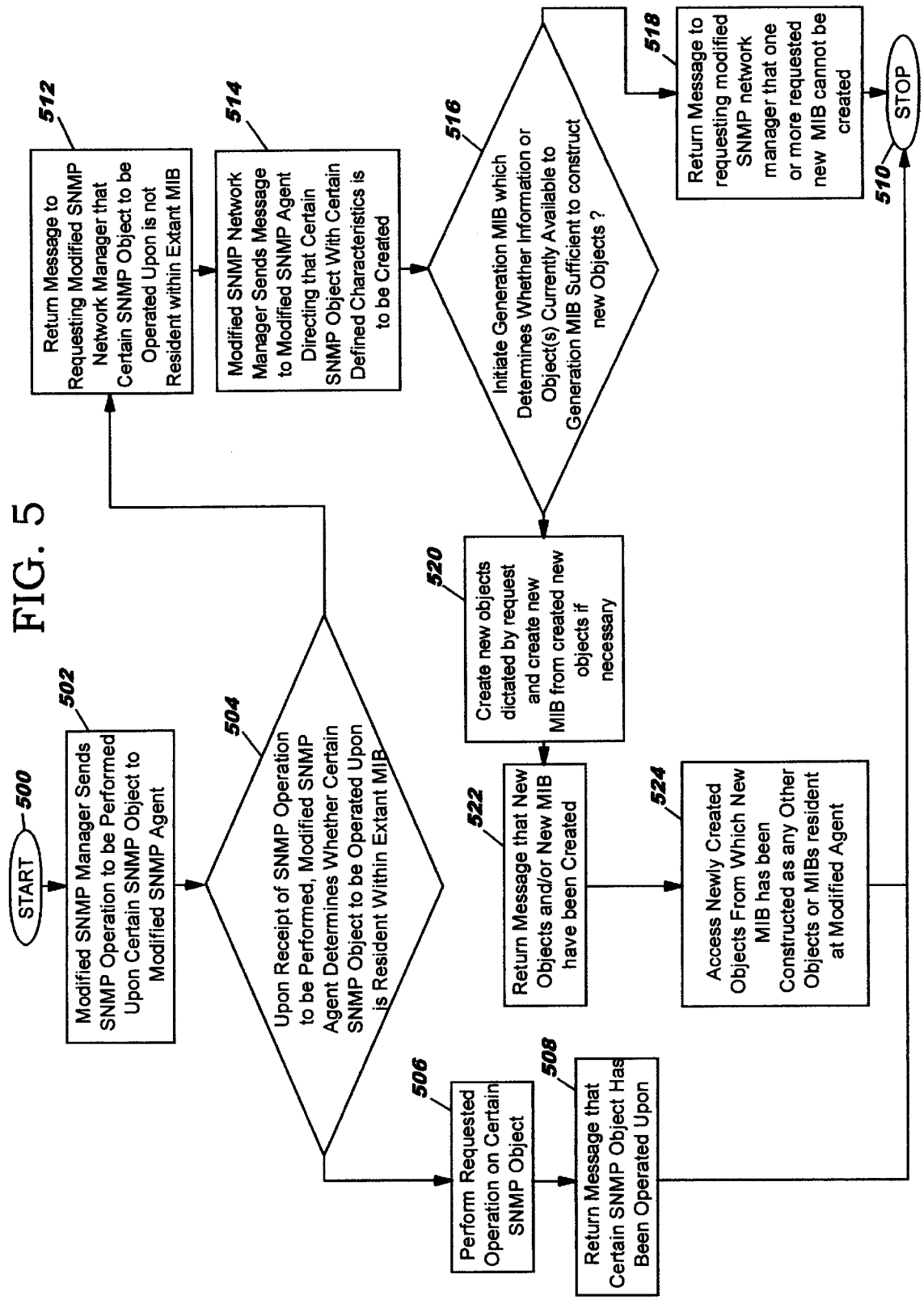
FIG. 5 is a high-level logic flowchart which illustrates an illustrative embodiment of the present invention.

FIG. 5 is a high-level logic flowchart which illustrates an illustrative embodiment of the present invention. Method step 500 shows the start of the process. Method step 502 illustrates the event of a modified SNMP manager sending an SNMP operation (such as a "GET," a "GET-NEXT," or "SET" operation) to a modified SNMP agent related to an object purportedly present within a MIB currently extant within the SNMP agent.

Method step 504 shows that in response, the modified SNMP agent determines whether the object to be operated upon is present within any MIB currently maintained by the SNMP agent. In the event that the object to be operated upon is present, method step 506 depicts that the modified SNMP agent performs the requested operation on the object. Thereafter, the process proceeds to method step 508 wherein it is illustrated that the modified SNMP agent returns a message to the modified SNMP network manager consistent with the operation requested. Subsequently, the process proceeds to method step 510 and stops.

In the event that the object to be operated upon is not present, method step 512 depicts the return of a message, sent by the modified SNMP agent to the modified SNMP network manager, indicating that the object is not present within any MIB maintained by the modified SNMP agent. Subsequent to the receipt of this message, the process proceeds to method step 514, wherein it is depicted that the modified SNMP network manager sends a message to the modified SNMP network agent directing generation of new objects, from which a new MIB is to be constructed, with characteristics as specified by the modified SNMP network agent in the message.

In response to the message directing generation of the new MIB, method step 516 shows that modified SNMP agent initiates a resident "generation MIB" (that is, an entity, accessible to modified SNMP agent, for generating new MIBs). This initiated "generation MIB" then determines whether there is enough information (e.g., extant objects within any MIBs currently resident within the device or any other device information to which the generation MIB is privy, which will vary from device manufacturer to device manufacturer) to which it has access sufficient to construct the one or more requested objects.

If it is determined that insufficient information is present such that the generation MIB can construct the designated new MIB, method step 518 illustrates that a message is sent by modified SNMP agent back to the requesting modified SNMP network manager indicating that fact.

If it is determined that information is present such that the generation MIB can construct the designated new MIB, method step 520 illustrates that the generation MIB then utilizes the information at the device available to it, in conjunction with the extensible grammar as was described and defined above, to create the requested objects from which will be constructed a MIB. Thereafter, method step 522 shows that modified SNMP agent returns a message to modified SNMP network manager that the requested objects, from which new MIB is to be constructed, have been created.

Subsequent to receiving the message that the specified new MIB has been created, the objects within the MIB can be accessed as is appropriate to the defined data type (syntax) of the new MIB (e.g., permanent, temporary, read-only, read-write, etc.), which is illustrated by method step 524. Thereafter, the process proceeds to method step 510 and stops.

Figure 6:
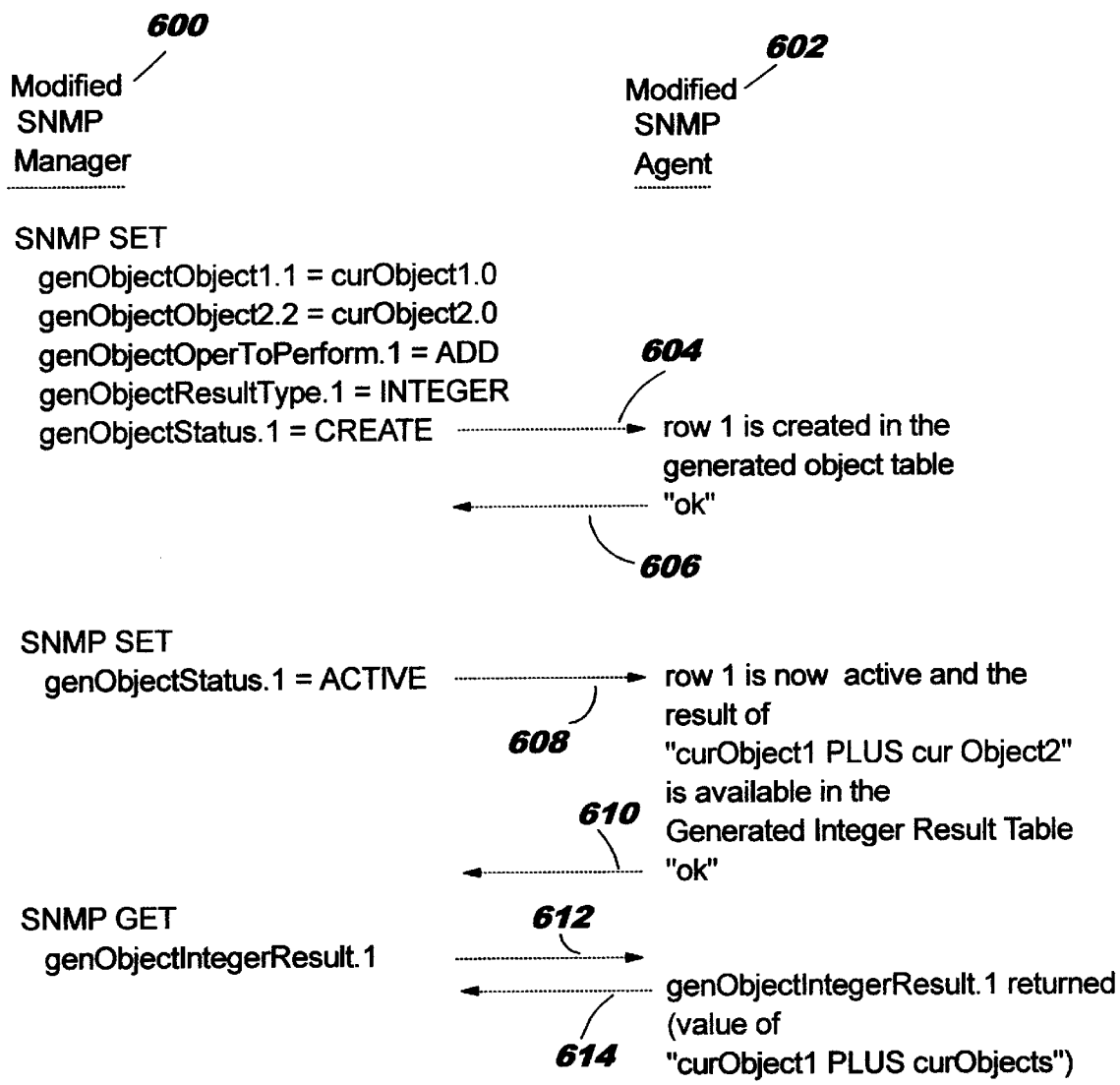
FIG. 6 illustrates how one embodiment of the present invention generates a new MIB utilizing a generation MIB.

FIG. 6 illustrates how one embodiment of the present invention generates a new MIB utilizing a generation MIB. By utilizing a generation MIB, one may do the following:

(1) create and then retrieve the value of objects which are derived from two or more other objects accessible by an agent at a network node or station. It should be noted that although only two objects are utilized in a single operation, the resulting object may be used as input to another operation; furthermore, since a long list of sequential operations are allowed, such sequential operations may be chained together to create new and interesting MIBs and objects. In addition, constants may be created and used in deriving a resulting value, and an object may also be mapped directly to another object.

(2) create and then retrieve the value of a new object which is derived from two or more other objects accessible to an agent at a node. This allows a new object to be created and thus allows a "non-supported" MIB to be suddenly supported by an agent at a node.

(3) create and then retrieve the value of an object which represents multiple object, and then be able to only retrieve the changed objects.

It has been mentioned above that the generation MIB generates new MIBs via use of the above-defined extensible grammar plus any information accessible by a modified SNMP agent. Three examples of how one embodiment of the present invention effect such generation will be set forth below.

FIG. 6 is a partially schematic diagram which depicts how one embodiment of the present invention utilizes the above defined extensible grammar, in conjunction with information accessible to a network agent residing within an network device to create and then retrieve the value of an object which is derived from two or more other object. FIG. 6 assumes two objects exist at a network device wherein a modified SNMP agent resides, and which are denoted in FIG. 6 as "curOject1.0," (current object one) and "curObject2.0" (current object two).

A "generation MIB" in one embodiment of the present invention accepts the following: (1) two operands (things to be operated upon); (2) the operation to be performed on the operand or operants; (3) the data type to associated with result of the operation to be performed; and, optionally (4) the object name by which the result of the operation is to be known as. In response to the foregoing, the "generation MIB" created tables which are used to define and track generated objects.

The first such table created is an "Object Generation Table," which is used to store the operands, operation, resultant data type, and any optional object names. The second such table is a "Generation Results Table" which is used to hold the value of operands operated upon. The third, fourth, and fifth tables are "constants" tables which allow defined operands to be given fixed value: (1) the "Integer Constants Table" which is used to create object which are integer constants which are then used as the value of defined operands in the "Object Generation Table"; (2) the "Counter Constants Table" which is used to create objects which are counter constants which are then used as the value of defined operands in the "Object Generation Table"; and (3) the "Gauge Constants Table" which is used to create gauge constants which are then used as the value of defined operands in the "Object Generation Table." The sixth such table is the "Group Table," which is used to keep track of which objects in a group have been changed. The seventh such table is the "Group Member Table," which is utilized in conjunction with an eighth such "Group Table" to create and track groups of objects. Concrete examples of the foregoing noted tables, created and utilized by a "Generation MIB", are as follows:

(1) Object Generation Table

One illustrative embodiment of the present invention creates and utilizes one or more "named" Object Generation Tables, which are utilized to define, create, and support MIBs and objects not normally supported by unmodified SNMP network managers and agents. Each Object Generation Table consists of rows, wherein each row is filled with the following information: an index (utilized in conjunction with the name of each Object Generation Table to identify individual row numbers); a first defined operand (utilized to designate certain information accessible (e.g., an existing object) by a modified SNMP agent); a second defined operand (utilized to designate certain information accessible (e.g., an existing object) by a modified SNMP agent); an operation to be performed upon first and second defined operands; a result type (the data type to be associated with the result of the defined operation performed upon the first and second defined operands); an (optional) result object name (utilized by a modified SNMP network manager and modified SNMP agent to manipulate and track the results of the defined operation performed upon the first and second defined operands such as an object contained in a "New MIB"); and a status designator (utilized by a modified SNMP network manager and modified SNMP agent to create and delete entries from an "Object Generation Table."

An example of how one illustrative embodiment arranges the foregoing data is the following table (which, it is to be understood, is to have a defined "name," such as "genObjectStatus" by which rows and columns of the table can be addressed via use of ASN.1; for example genObjectStatus1.2 would refer to the last object in the second row of "Object Generation Table"named "genObjectStatus"):

| | | (2) Generation Results Table(s) | | | | |
|---|---|---|---|---|---|---|
| Index | Object1 | Object2 | Result Operation | Result Type | Object | Status |
| 1 | curObject1 | curObject2 | ADD | Integer | — | Active |
| 2 | curObject1 | curObject1 | EQUAL | Integer | newObject1 | Active |

It will be noted that, while the foregoing "Object Generation Table" had an entry for the name of the result of an operation, no such entry was present for the result of an operation. In one illustrative embodiment, such entry is provided by one or more "Generation Results Tables, which "augment" an "Object Generation Table" by providing extra columns at the end of the table in which various and sundry results may be stored. One illustrative embodiment of the present invention generates and utilizes the following different "Generation Results Tables": (1) an "Integer Results Table" (which is created for rows in an "Object Generation Table" which have a "Result Type" of Integer); (2) a "Counter Results Table" (which is created for rows which have a "Result Type" of Counter); and (3) a "Gauge Results Table" (which is created for rows which have a "Result Type" of Gauge). An example of how one illustrative embodiment arranges the foregoing data is the following three tables, which are shown as "augmenting" the "Object Generation Table" set forth above:

| | (3) Constants Table | | | |
|---|---|---|---|---|
| | Object Generation Table | Integer Results Table | Counter Results Table | Gauge Results Table |
| Index | Object 1 | Value | Value | Value |
| 1 | curObject1 | 32 | N/A | N/A |
| 2 | curObject1 | 66 | N/A | N/A |

One illustrative embodiment of the present invention also makes use of the following three types of "Constants Tables": (1) an "Integer Constants Table" (which is used to create Objects which are Integer Constants, which are thereafter used as one or both of the values for a first defined operand or a second defined operand in an Object Generation Table row); (2) a "Counter Constants Table" (which is used to create Objects which are Counter Constants, which are thereafter used as one or both of the values of a first defined operant or a second defined operand in an Object Generation Table row; and (3) a "Gauge Constants Table" (which is used to create Objects which are Gauge Constants, which are thereafter used as one or both of the values of a first defined operand or a second defined operand in an Object Generation Table row. An example of how one illustrative embodiment arranges the foregoing data is the following "Integer Constants Table" which augments (although such augmentation is not shown here) a row (with the row now denoted by "Index") of some "Object Generation Table":

| (4) Group Table | | |
|---|---|---|
| Index | Value | Status |
| 1 | 44 | Active |

One illustrative embodiment of the present invention allows the definition and monitoring of groups of objects. One mechanism by which this is done is known as a "Group Table." A group table contains the following data: (1) an "index" (which is equated to a row number of a named "Object Generation Table" with which the "Group Table" is associated); (2) a "Change String" indicator (which is a hex string used to represent which (if any) objects in the group have changed; each bit position represents the change status of a corresponding ordinarily positioned object in the group); (3) a "Change Flag=integer (yes/no)" indicator (which is an object used to indicate if any Objects in the group have changed); (4) a "Reset" (indicator which is used to reset the change flag from Yes (something has changed) to No (nothing has changed)); and (5) a "status" indicator (which is used to create and delete entries from the "Group Table). An example of how one illustrative embodiment arranges the foregoing data is the following "Group Table."

| (5) Group Member Table | | | | |
|---|---|---|---|---|
| Index | Change String | Change Flag | Reset | Status |
| 1 | 000000000 | No | ready | Active |

One illustrative embodiment creates and maintains groups through use of a "Group Member Table." A "Group Member Table" has the following entries which are used to define and maintain a group: (1) an "Index1" indicator (which equates to a row number of a Group Table, such as the one defined above); (2) an "Index2" indicator (which equates to a member number of a the row defined by "Index1" of a Group Table, such as the one defined above); (3) an object which is to be a member of the group that is to be defined by the "Group Member Table"; and (4) a "status" indicator (which is used to create and delete entries from this table). An example of how one illustrative embodiment arranges the foregoing data is the following "Group Table."

| Index1 | Index2 | Object | Status |
|---|---|---|---|
| 1 | 1 | curObject1 | Active |
| 1 | 2 | curObject2 | Active |

With the foregoing in mind, shown in FIG. 6 is that modified SNMP manager 600 sends a SNMP "SET" message 604 to a modified SNMP agent 602, wherein SNMP "SET" message 604 directs modified SNMP agent 602 to create an "Object Generation Table" with a first row named genObjectStatus.1 (genObjectStatus.1=CREATE, in FIG. 6) wherein that first created row will consist of two operands equated with objects currently extant at the device and accessible by modified SNMP agent 602 (genObjectObject1.0=curObject1.0 and genOjbect2.0, in FIG. 6), with the operation to be performed on the operands to be addition (genOjbectOpertoPerfom.1=ADD), and with the resultant of the operands being operated upon being designated of type integer (genObjectResultType.1=INTEGER).

In response to this request, modified SNMP agent 602 creates a row 1 having such information in a generated object table, augmented by an "integer results table" and subsequently sends return message 606 that the requested object has been created.

Thereafter, modified SNMP manager 600 can treat created genObjectStatus.1 as any other SNMP MIB object. Consequently, modified SNMP manager 600 sends SNMP "SET" message 608 directing modified SNMP agent 602 to activate the created row 1 in the "Object Generation Table" (genOjbectStatus.1=ACTIVE, in FIG. 6). In response to message 608, modified SNMP agent 602 activates the created MIB genObjectStatus.1 and thereafter sends return message 610 that genObjectStatus.1 has been activated.

Since genObjectStatus.1 is now active, modified SNMP manager 600 can now treat the object as it would any other object ordinarily supported by modified SNMP agent 600. As an illustration of this, shown is that modified SNMP manager 600 sends SNMP "GET" message 612 in response to which as is shown in message 614, the current value of object(s) in the created MIB genObjectStatus.1 is/are returned (genObjectintergerResult.1 returned, in FIG. 6), which as shown, is the sum of curObject1.0 plus curObject2.0). It should be noted that the returned object (genObjectintergerResult.1) is associated with the integer result column of the "Generation Results Table" created by the generation object, which has been discussed above. It should also be noted that, although only one result was specified, more than one result could be specified (such as creating a counter object) whose value would also be returned in response to SNMP "GET" message 612 if such had previously been defined.

Figure 7:
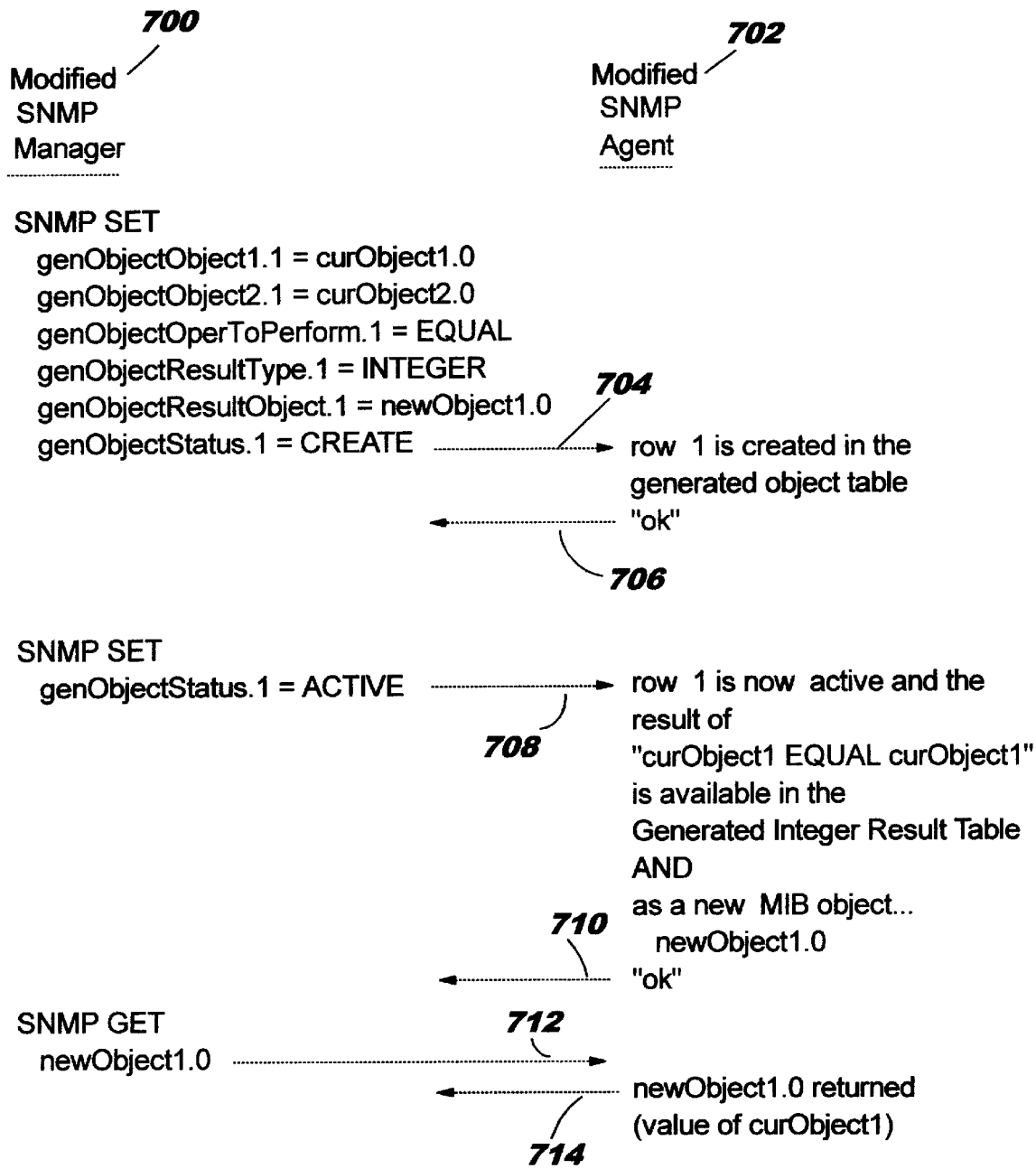
FIG. 7 is a partially schematic diagram which depicts how one embodiment of the present invention utilizes an extensible grammar, in conjunction with information accessible to a network agent residing within a network device, to create and then retrieve the value of a NEW object which is derived from two or more other objects.

FIG. 7 is a partially schematic diagram which depicts how one embodiment of the present invention utilizes the above defined extensible grammar, in conjunction with information accessible to a network agent residing within a network device, to create and then retrieve the value of a NEW object which is derived from two or more other objects. FIG. 7 assumes two objects exist at a network device wherein a modified SNMP agent resides, and which are denoted in the FIG. 7 as "curOject1.0," (current object one) and "curObject2.0" (current object two).

Keeping in mind the discussion of the generation MIB as was set forth in FIG. 6, shown in FIG. 7 is that a modified SNMP manager 700 sends SNMP "SET" message 704 to a modified SNMP agent 702, wherein SNMP "SET" message 704 directs modified SNMP agent 702 to create an "Object Generation Table" having a first row named genObjectStatus.1 (genObjectStatus.1=CREATE, in FIG. 7) wherein that first created row will consist of two operands equated with objects currently extant at the device and accessible by modified SNMP agent 702 (genObjectObject1.0=curObject1.0 and genOjbect2.0=curObject2.0, in FIG. 7), with the operation to be performed on the operands to be a determination of whether the two objects are equal to each of the (genOjbectOpertoPerfom.1=EQUAL), and with the resultant of the operands being operated upon being designated of type integer (genObjectResultType.1=INTEGER), and with that resultant being given an object name by which it can be accessed (genObjectResultObject.1=newObject1.0).

In response to this request, modified SNMP agent 702 creates a row 1 having such information in a generated object table, augmented by an "integer results table" and subsequently sends return message 706 that the requested object has been created.

Thereafter, modified SNMP manager 700 can treat created genObjectStatus.1 as any other SNMP MIB object. Consequently, modified SNMP manager 700 sends SNMP "SET" message 708 directing modified SNMP agent 602 to activate the created row in the "Object Generation Table" (genOjbectStatus.1=ACTIVE, in FIG. 7). In response to message 708, modified SNMP agent 702 activates the created row genObjectStatus.1 and thereafter sends return message 710 that genObjectStatus.1 has been activated.

Since genObjectStatus.1 is now active, modified SNMP manager 700 can now treat the object as it would any other object ordinarily supported by modified SNMP agent 700. As an illustration of this, shown is that modified SNMP manager 700 sends a SNMP "GET" newobjectl.1.0 message 712. Upon receipt of SNMP "GET" newobject.1.0 message 712, message 714 illustrates that modified SNMP agent 702 returns newObject1.0, wherein is contained the current value of the result of the defined operation in the created genObjectStatus.1 (genObjectintergerResult.1 returned, in FIG. 7), which as shown, is the result of inquiring as to whether curObject.1.0 equals curObject2.0). It should be noted that the returned object (genObjectIntergerResult.1) is associated with the integer result column of the "Generation Results Table" created by the generation object, which has been discussed above.

Figure 8:
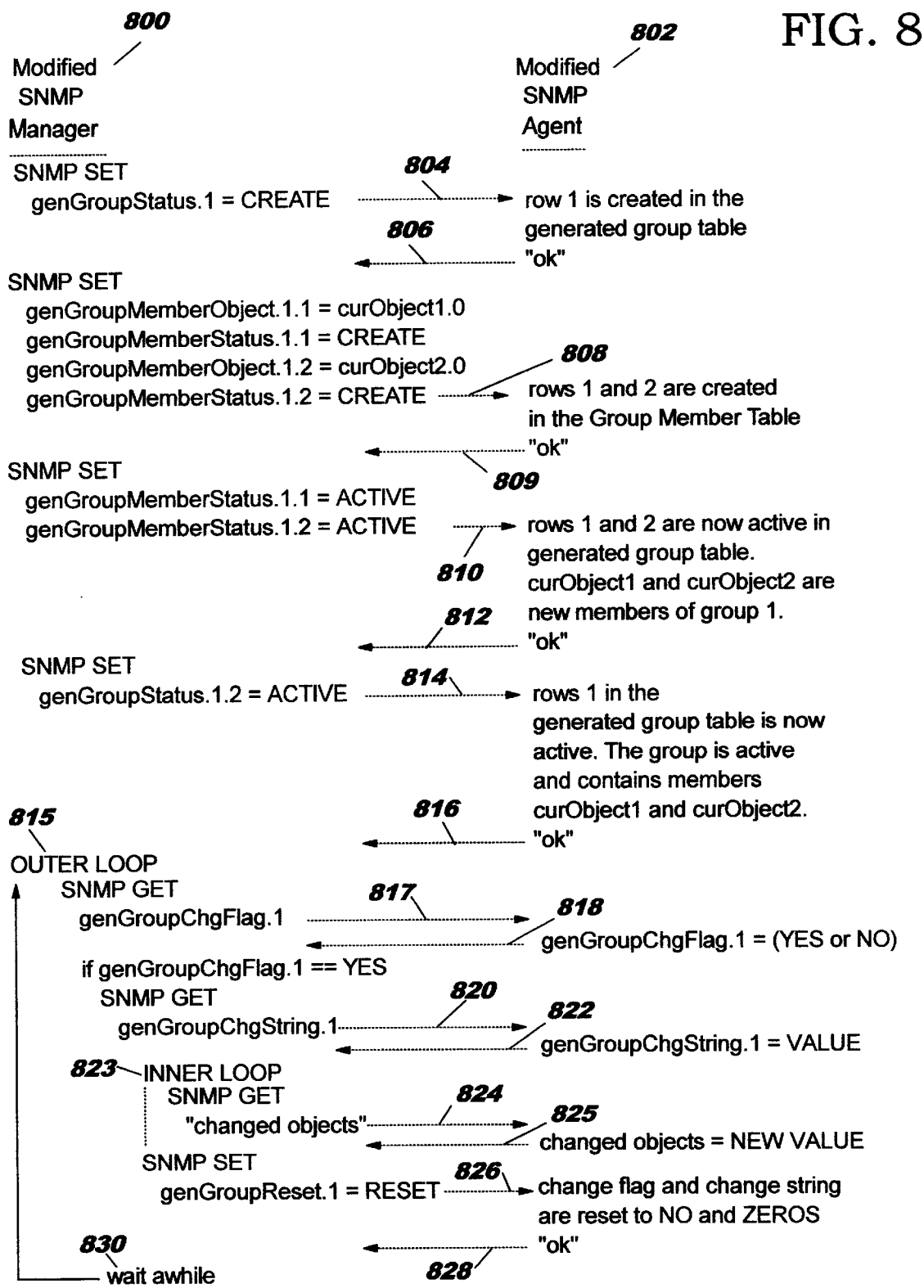
FIG. 8 is a partially schematic diagram which depicts how one embodiment of the present invention utilizes the extensible grammar, in conjunction with information accessible to a network agent residing within an network device, to create and then retrieve the value of ONE object which represents multiple objects.

FIG. 8 is a partially schematic diagram which depicts how one embodiment of the present invention utilizes the above defined extensible grammar, in conjunction with information accessible to a network agent residing within a network device, to create and then retrieve the value of ONE object which represents multiple objects.

Keeping in mind the discussion of the "Generation MIB" as set forth in FIG. 6, shown in FIG. 8 is that modified SNMP manager 800 sends SNMP "SET" message 804 to a modified SNMP agent 802, wherein SNMP "SET" message 804 directs modified SNMP agent 802 to create an "Object Generation Table" having a first row named genObjectStatus.1.

In response to this request, modified SNMP agent 802 creates a row 1 having such information in a "Generated Object Table," and subsequently sends return message 806 that the requested object has been created.

In response to notification that the requested "Generated Object Table" row has been created by modified SNMP agent 802, message 808 illustrates that modified SNMP network manager 800 defines that the first created row will consist of two "group member" operands equated with objects currently extant at the device and accessible by modified SNMP agent 802 (genGroupMemberObject 1.1 (which means the first member of row 1 of the group table)=curObject1.0 and genGroupMemberOjbect1.2 (which means the second member of row 1 of the group table)=curObject2.0, in FIG. 8), with the operations to be performed on the operands to be the operation of according the objects, represented by the two operands, group member status (genGroupMemberStatus.1.1=CREATE and genGroupMemberStatus.1.2=CREATE). Message 809 illustrates that once the foregoing noted attributes of the row have been set, modified SNMP agent 802 informs modified SNMP network manager 800 of that fact.

Thereafter, modified SNMP manager 800 can utilize the created group as it would any other SNMP MIB object. Consequently, modified SNMP manager 800 sends SNMP "SET" message 810 directing modified SNMP agent 802 to activate two members of the created "Group Member Table" (genGroupMemberStatus.1.1=ACTIVE and genGroupMemberStatus.1.2=ACTIVE, in FIG. 8). In response to message 810, modified SNMP agent 802 activates the designated created group members and thereafter sends return message 812 that the designated created group members have been activated.

After the designated created group members have been activated, the created group itself can be activated. Consequently, shown is that modified SNMP manager 800 sends SNMP "SET" message 814 directing modified SNMP agent 802 to activate rows 1 and 2 of the created "Group Member Table" (genGroupStatus.1.2=ACTIVE, in FIG. 8). (It should be noted that the form of the command is due to the actual structure of the "Group Member Table, as was discussed above, but that conceptually the command is just activating a group composed of the two activated members).

In response to message 814, modified SNMP agent 802 activates the designated created group and thereafter sends return message 816 that the designated created group has been activated.

Since the designated created group is now active, modified SNMP manager 800 can now treat the object as it would any other object ordinarily supported by modified SNMP agent 800. As an illustration of this, shown is outer loop 815 wherein modified SNMP manager 800 sends a SNMP "GET" genGroupChgFlag.1 message 817 (this message is essentially an inquiry as to whether the group has changed subsequent to a last inquiry). Upon receipt of SNMP "GET" genGroupChgFlag.1 message 816, modified SNMP agent 802 returns genGroupChgFlag.1=(YES or NO) message 818, which is indicative of whether or not the defined group has changed since the last time modified SNMP network manager 800 inquired regarding the group.

In the event that genGroupChgFlag.1 is returned equal to "YES," it is known that something about the group has changed, consequently, it is shown that SNMP "GET" genGroupChgString.1 message 820 is sent by modified SNMP network manager 800 to modified SNMP agent 802. Upon receipt of SNMP "GET" genGroupChgString.1 message 820, message 822 illustrates that modified SNMP agent 802 returns genGroupChgString.1=VALUE, where VALUE is indicative of the members of the group that have changed (such as the "Change String" of a "Group Table," as was described above, where the state of the single-bit members correspond to members within the group that have changed).

Thereafter, inner loop 823 is engaged in, wherein it is depicted that VALUE is utilized to retrieve the members of the group that have changed via the use of SNMP "GET" 'changed objects' messages 824, in response to which modified SNMP agent 800 returns the new value for each requested 'changed object,' as is illustrated by message 825.

After VALUE has been utilized by inner loop 823 to retrieve all the new values of the group objects that have changed, message 826 illustrates that the change flag is reset to no, and that the change string is reset to all (indicated in FIG. 8 by genGroupReset.1=RESET message 828).

Either in the event that genGroupChgFlag.1 is returned equal to "NO," or after all new objects in the group have been retrieved, operation wait awhile 830 is engaged in, wherein processing ceases until outer loop 815 is re-engaged at in some predetermined time later.

What is claimed is:

1. A method for monitoring and managing a network having at least one network manager resident within a network station and at least one network agent resident within a network device, the method comprising the steps of:

grouping interactively one or more network parameters of one or more network devices;

in response to the grouping step, automatically constructing a group monitor at the network agent wherein any changes of the grouped one or more network parameters are reflected by the constructed group monitor; and monitoring the constructed group monitor instead of individual groups of network parameters for indications of changes in any of said grouped network parameters.

2. The method of claim 1, wherein the step of grouping further comprises the steps of:

selecting, on the basis of specific network management criteria, the one or more network parameters of one or more network devices; and creating a group containing the selected one or more network parameters of one or more network devices.

3. The method of claim 2, wherein the step of constructing further comprises the steps of:

constructing a string, for a network device having one or more network parameters included within the created group, wherein unique regions within the constructed string identify one or more network parameters of the network device having one or more network parameters included within the created group; and building a monitoring object containing the string constructed for a network device having one or more network parameters including within the created group.

4. The method of claim 3, wherein the step of constructing a string further comprises the step of associating a bit with each of the one or more network parameters including within the created group such that a change in the associated bit represents a change in a corresponding parameter of the network device.

5. The method of claim 3, wherein the step of monitoring further comprises the steps of:

querying the network agent as to the status of the built monitoring object;

in response to the query, examining the constructed string contained within the built monitoring object for an indication that one or more corresponding network parameters of interest of the device have changed; and in response to an indication that one or more network parameters have changed, examining the changed network parameters such that network parameters of interest need only be examined when the parameters change.

6. A system for monitoring and managing a network having at least one network manager resident within a network station and at least one network agent resident within a network device, said system comprising:

means for grouping one or more network parameters of one or more network devices;

means, responsive to said means for grouping, for automatically constructing a group monitor at the network agent wherein any changes of said grouped one or more network parameters are reflected by said constructed group monitor; and means for monitoring said constructed group monitor instead of individual groups of network parameters for indications of changes in any of said grouped network parameters.

7. The system of claim 6, wherein said means for grouping further comprises:

means for selecting, on the basis of specific network management criteria, said one or more network parameters of one or more network devices; and means for creating a group containing said selected one or more network parameters of one or more network devices.

8. The system of claim 7, wherein said means for constructing further comprises:

means for constructing a string, for a network device having one or more network parameters included within said created group, wherein unique regions within said constructed string identify one or more network parameters of said network device having one or more network parameters included within said created group; and means for building a monitoring object containing said strings constructed for a network device having one or more network parameters included within said created group.

9. The system of claim 8, wherein said means for constructing a string further comprises means for associating a bit with each of the one or more network parameters included within said created group such that a change in said associated bit represents a change in a corresponding parameter of said network device.

10. The system of claim 8, wherein said means for monitoring further comprises:

means for querying said network agent as to the status of said built monitoring object;

means, responsive to said query, for examining said constructed strings contained within said built monitoring object for an indication that one or more corresponding network parameters of interest of the device have changed; and means, responsive to an indication that one or more network parameters have changed, for examining said changed network parameters such that network parameters of interest need only be examined when said parameters change.

11. A program product for monitoring and managing a network having at least one network manager resident within a network station and at least one network agent resident within a network device, said program product comprising:

program code for grouping one or more network parameters of one or more network devices;

program code responsive to said program code for grouping, for automatically constructing a group monitor at the network agent wherein any changes of said grouped one or more network parameters are reflected by said constructed group monitor;

program code for monitoring said constructed group monitor instead of individual groups of network parameters for indications of changes in any of said grouped network parameters; and signal bearing media bearing said program code for grouping, said program code for constructing, and said program code for monitoring.

12. The program product of claim 11, wherein said signal bearing media further comprises transmission media.

13. The program product of claim 11, wherein said signal bearing media further comprises recordable media.

14. The program product of claim 11, wherein said program code for grouping further comprises:

program code for selecting, on the basis of specific network management criteria, said one or more network parameters of one or more network devices; and program code for creating a group containing said selected one or more network parameters of one or more network devices.

15. The program product of claim 14, wherein said program code for constructing further comprises:

program code for constructing a string, for a network device having one or more network parameters included within said created group, wherein unique regions within said constructed string identify one or more network parameters of said network device having one or more network parameters included within said created group; and program code for building a monitoring object containing said string constructed for a network device having one or more network parameters included within said created group.

16. The program product of claim 15, wherein said program code for constructing a string further comprises program code for associating a bit with each of the one or more network parameters included within said created group such that a change in said associated bit represents a change in a corresponding parameter of said network device.

17. The program product of claim 15, wherein said program code for monitoring further comprises:

program code for querying said network agent as to the status of said built monitoring object;

program code responsive to said query, for examining said constructed string contained within said built monitoring object for an indication that one or more corresponding network parameters of interest of the device have changed; and program code, responsive to an indication that one or more network parameters have changed, for examining said changed network parameters such that network parameters of interest need only be examined when said parameters change.

* * * * *